(12) United States Patent
Lauderdale

(10) Patent No.: US 9,145,980 B2
(45) Date of Patent: Sep. 29, 2015

(54) REDUNDANT ACTUATION SYSTEM

(75) Inventor: Donald Lauderdale, Cypress, TX (US)

(73) Assignee: Baker Hughes Incorporated, Houston, TX (US)

( * ) Notice: Subject to any disclaimer, the term of this patent is extended or adjusted under 35 U.S.C. 154(b) by 654 days.

(21) Appl. No.: 13/531,617

(22) Filed: Jun. 25, 2012

(65) Prior Publication Data

US 2013/0340832 A1  Dec. 26, 2013

(51) Int. Cl.
*F16K 37/00* (2006.01)
*E21B 34/10* (2006.01)
*E21B 34/00* (2006.01)

(52) U.S. Cl.
CPC ............. *F16K 37/0058* (2013.01); *E21B 34/10* (2013.01); *E21B 2034/007* (2013.01); *Y10T 137/0324* (2015.04); *Y10T 137/8359* (2015.04)

(58) Field of Classification Search
CPC ..... F16K 37/00; F16K 37/0058; E21B 34/10; E21B 34/16
USPC .......................... 251/14, 343, 344; 137/2, 559
See application file for complete search history.

(56) References Cited

U.S. PATENT DOCUMENTS

| 3,824,850 | A  | * | 7/1974  | Nutter ......................... 73/152.23 |
| 4,331,315 | A  | * | 5/1982  | Geisow ........................... 251/14 |
| 6,422,317 | B1 | * | 7/2002  | Williamson, Jr. ............. 166/374 |
| 8,469,106 | B2 | * | 6/2013  | Caminari et al. ............. 166/373 |
| 2003/0019629 | A1 | * | 1/2003  | Thompson .................... 166/320 |
| 2004/0020657 | A1 | * | 2/2004  | Patel .............................. 166/373 |
| 2004/0154806 | A1 |   | 8/2004  | Bode et al. |
| 2006/0124320 | A1 |   | 6/2006  | Smith et al. |
| 2007/0119594 | A1 | * | 5/2007  | Turner et al. ................... 166/319 |
| 2008/0110615 | A1 |   | 5/2008  | Xu |
| 2009/0159264 | A1 | * | 6/2009  | Turner et al. ................... 166/113 |
| 2010/0300702 | A1 |   | 12/2010 | Andrews et al. |
| 2012/0067595 | A1 | * | 3/2012  | Noske et al. ................... 166/373 |
| 2015/0027724 | A1 | * | 1/2015  | Symms ......................... 166/373 |

OTHER PUBLICATIONS

Baker Hughes, [online]; [retrieved on Jul. 18, 2012]; retrieved from the Internet http://www.bakerhughes.com/products-and-services/completions/well-completions/sand-control-pumping-tools-and-services/fluid-loss-control-devices, "Downhole Reservoir Control Devices," 1 p.

(Continued)

*Primary Examiner* — John K Fristoe, Jr.
*Assistant Examiner* — Daniel Donegan
(74) *Attorney, Agent, or Firm* — Cantor Colburn LLP

(57) ABSTRACT

A valve assembly including a plurality of control systems. A member is included that is actuatable by each of the control systems for controlling operation of the valve assembly. A plurality of tangs is included with at least one tang corresponding to each control system. A plurality of windows each having a shoulder is included, each tang disposed in one of the windows and selectively engagable with the shoulder of the one of the windows. The tangs and the windows are operative together to enable actuation forces to be selectively transferred from any group of selected ones of the control systems to the member via the tangs and the shoulders of corresponding ones of the windows for actuating the member while simultaneously permitting relative movement between the windows and the tangs corresponding to unselected ones of the control systems. A method of operating a valve assembly is also included.

20 Claims, 3 Drawing Sheets

(56) References Cited

OTHER PUBLICATIONS

Baker Hughes, [online]; [retrieved on Jul. 18, 2012]; retrieved from the Internet http://c14503045.r45.cf2.rackcdn.com/v1/1898686062ff87da05b685f517ba3f39/30264t-sandcontrolsystems_catalog-1110.pdf, "Model RB Isolation Valve," p. 52.
International Search Report and Written Opinion; International application No. PCT/US2013/041368; International filing date: May 16, 2013; Date of Mailing: Aug. 12, 2013; 10 pages.

* cited by examiner

REDUNDANT ACTUATION SYSTEM

BACKGROUND

Valves are ubiquitous in the downhole drilling and completions industry for enabling the control of fluids downhole. Due to the complexity and cost in completing a well, the reliability of valves and of control systems for controlling valves, is paramount. Barrier valves, for example, must be reliably and timely actuated or controlled at various times throughout the life of a well, e.g., in order to isolate a lower completion prior to production, during work-over operations, etc., while also enabling production when an upper completion is installed. Further, to ensure operation of the valve is possible even in the event that some portion of the control system for the valve fails, it is often desired to have a redundancy in the control system or a contingent mode of actuation thereof. While various systems are known and used for these purposes, the industry is always desirous of new and alternate systems to increase the reliability of valve assemblies.

SUMMARY

A valve assembly including a plurality of control systems; a member actuatable by each of the control systems for controlling operation of the valve assembly; a plurality of tangs, at least one tang corresponding to each of the control systems; and a plurality of windows each having at least one shoulder, each tang disposed in one of the windows and selectively engagable with the at least one shoulder of the one of the windows, the tangs and the windows operative together to enable actuation forces to be selectively transferred from any group of selected ones of the control systems to the member via the tangs and the shoulders of corresponding ones of the windows for actuating the member while simultaneously permitting relative movement between the windows and the tangs corresponding to unselected ones of the control systems.

A method of operating a valve assembly comprising: selecting a subset of control systems from a plurality of control systems for the valve assembly, each control system having at least one tang corresponding thereto, each tang being disposed in one of a plurality of windows; actuating the subset of selected control systems; engaging each tang corresponding to the subset of selected the control systems with a shoulder of the one of the windows associated therewith; transferring actuation forces from the subset of selected control systems to a valve member of the valve assembly via each tang engaged with the shoulder of the one of the windows associated therewith; actuating the valve member between at least a first position and a second position; and permitting, simultaneously to actuation of the valve member, relative movement between tangs corresponding to unselected ones of the control system and the ones of the windows associated therewith.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the Figures.

Figure 1:
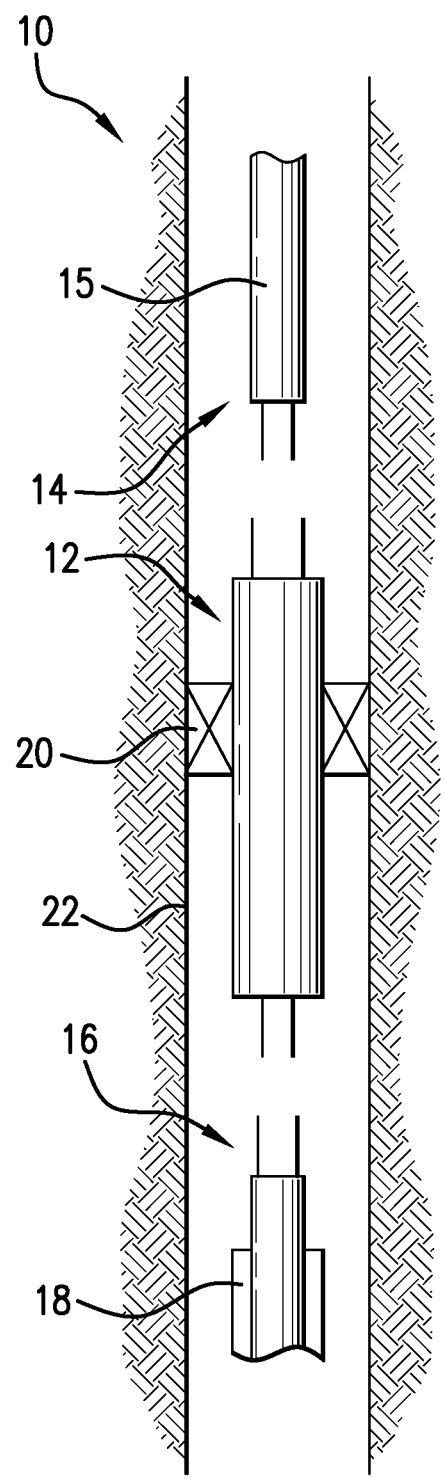
FIG. 1 is a cross-sectional view schematically illustrating a completion having a barrier valve assembly.

Referring now to FIG. 1, a completion 10 is illustrated having a barrier valve assembly 12 is for controlling the flow of fluid between an upper completion 14, e.g., having a production string 15, and a lower completion 16, e.g., including one or more gravel/frac pack or screen assemblies 18. A packer device 20 may be included with the assembly 12 for also isolating opposite sides of an annulus of a borehole 22 in which the assembly 12 is run. The specifics of the upper completion 14, the lower completion 16, and the packer device 20 are not particularly germane to the current invention and will not be described in detail herein as one of ordinary skill in the art will readily appreciate the myriad of tools, systems, assemblies, and arrangements that can be used for, or with, these components. It is also to be appreciated that valves other than a barrier valve disposed between an upper and a lower completion could benefit from the current invention disclosed herein, and that this is given as one example only.

Figure 2:
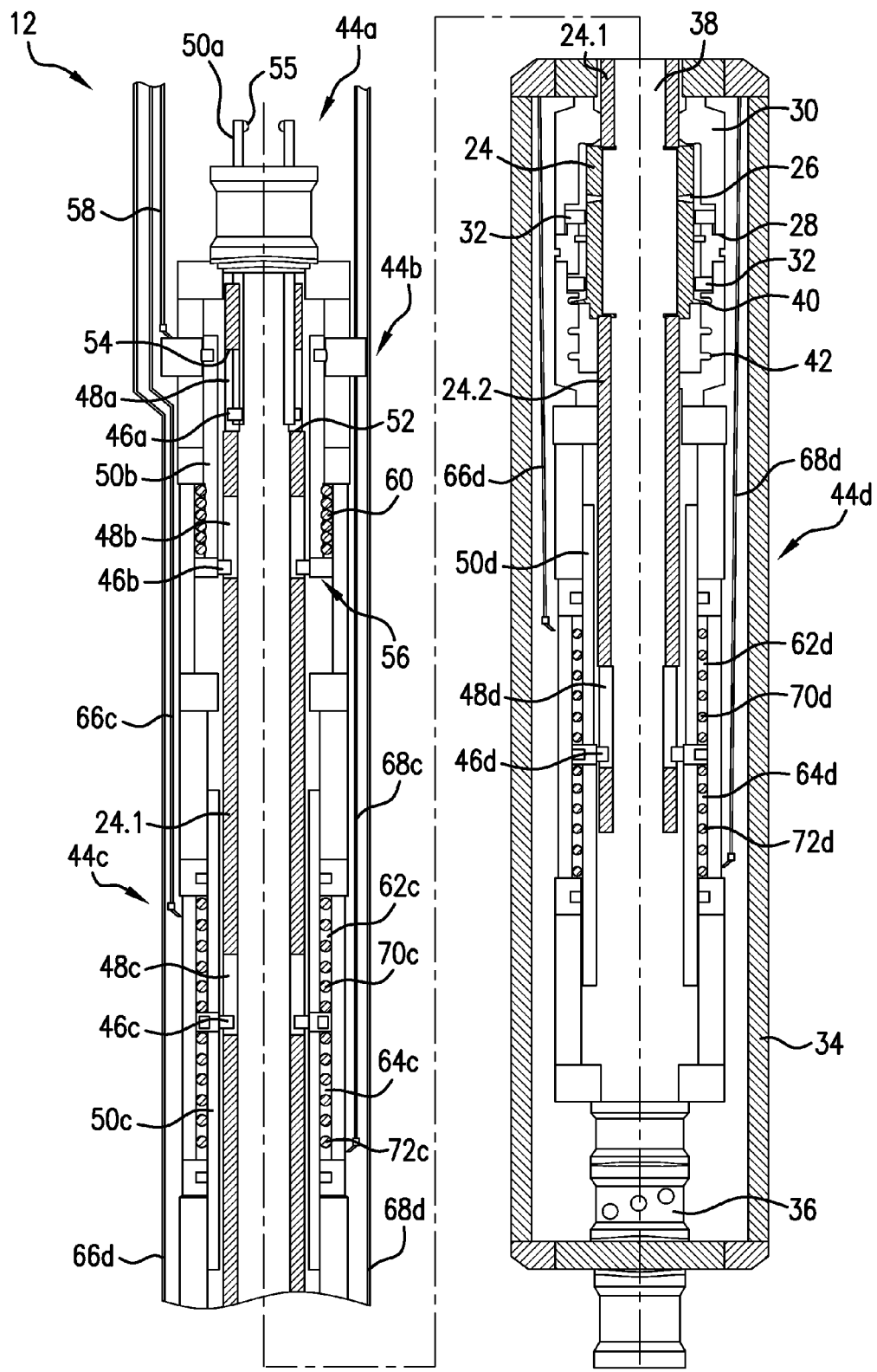
FIG. 2 is a cross-sectional view of a barrier valve assembly in a closed configuration.

The barrier valve assembly 12 is shown in more specificity in FIG. 2. The assembly 12 includes an actuatable member or sleeve 24 for ultimately controlling fluid flow through the valve assembly 12. Namely, the sleeve 24 includes one or more ports 26 therein that are selectively alignable by moving the sleeve 24 with one or ports 28 in a valve housing 30 of the valve assembly 12. While shown and described as a sleeve having alignable ports, it is to be appreciated that the member controlling operation of the valve 12 could take any other suitable form, e.g., a rotatable ball element, flapper, etc.

In the illustrated embodiment, for example, a flow of fluid may be directed up to the valve assembly 12 (e.g., formation fluid taken in by the lower completion 16 at the frac assembly 18), where the flow is routed into an area defined by a shroud 34, e.g., via ports in a perforated pup joint 36, before being redirected back into a fluid passageway 38 defined through the valve assembly 12 (which passageway 38 is, e.g., in fluid communication with the upper completion 14 and/or the production string 15 for enabling production of the fluid) when the sleeve 24 is in an open position. The sleeve 24 is illustrated in FIG. 2 in a closed position in which the ports 26 and 28 are misaligned and sealed off from each other by suitable seal elements 32. Shifting the sleeve 24 from the position shown in FIG. 2 to the position shown in FIG. 3 will align the ports 26 and 28 in order to permit fluid within the shroud 34 to flow into the passageway 38 and then to surface or some other location. In order to prevent inadvertent or premature actuation of the sleeve 24, the sleeve 24 may include a releasable locking or holding mechanism, e.g., a collet 40 and a plurality of recesses 42, for enabling the sleeve 24 to be temporarily held in a position until a suitable force is applied to release the collet 40 and shift the sleeve 24.

In order to control the position of the sleeve 24, and therefore the open/closed status of the valve assembly 12, the assembly 12 includes a multiplicity of redundant control systems, collectively referred to as control systems 44, but independently designated 44a, 44b, 44c, and 44d for the sake of discussion. In this way, control and actuation of the valve assembly 12 can be assured even if one or more of the control systems experiences failure, becomes unresponsive, sticks, freezes, etc. In the illustrated embodiment there are four such control systems, although one will readily appreciate that other embodiments may have a greater or lesser number of redundant control systems.

In order to actuate the sleeve 24 and thus control the valve assembly 12, each of the control systems 44 is able to be engaged or coupled to the sleeve 24. Namely, in the illustrated embodiment, the sleeve 24 includes a first extension 24.1 extending axially from one side of the sleeve 24 (e.g., in the up-hole direction) to the control systems 44a, 44b, and 44c, and a second extension 24.2 extending axially from the sleeve 24 in the opposite direction (e.g., in the downhole direction) to the control system 44d. It is to be appreciated that the sleeve 24 with the extensions 24.1 and 24.2 could be arranged as a single integrally formed member or as a plurality of separate members affixed together. Furthermore, it is to be appreciated that any number of the systems 44 could be located on either side of the sleeve 24, e.g., all up-hole, all downhole, two up-hole and two downhole, etc. By positioning at least one control system on either side, the sleeve 24 can be shifted both open and closed by exerting forces in either direction (pulling/tension and pushing/compression). That is, for example, the control systems 44a, 44b, and 44c all "pull" the sleeve 24 closed, while the control system 44d "pushes" the sleeve 24 closed (and the opposite for shifting the sleeve 24 open), which may facilitate actuation if pushing and/or pulling becomes a desired mode of shifting the sleeve 24, e.g., due to downhole conditions, equipment quirks, etc.

Advantageously, the control systems 44, while each able to move the sleeve 24, are arranged to operate independently of each other and are not physically connected to each other or the sleeve 24. In other words, there is at least some degree of relative movement possible between each of the control systems 44 and the sleeve 24. In this way, any given control system is capable of operating the valve assembly 12, regardless of the failure, malfunction, non-responsiveness, or even purposeful non-actuation of some or all of the other control systems. As one example, the control system 44b would be able to control the operation of the sleeve 24 even if all three of the other control systems 44a, 44c, and 44d break, fail to respond, are not triggered, etc. In order to provide this independent operation of the control systems 44, each of the control systems 44 includes one or more tangs or lugs 46 (designated individually as tangs 46a, 46b, 46c, and 46d for the systems 44a-44d, respectively) that are disposed in one or more windows, slots, or openings 48 (designated individually as windows 48a, 48b, 48c, and 48d for the systems 44a-44d, respectively) in the sleeve 24, or one of the extensions 24.1, 24.2. The tangs 46 are each affixed to a sleeve or member 50 (designated individually as sleeves 50a, 50b, 50c, and 50d for the systems 44a-44d, respectively) that are movably disposed with the sleeve 24 and/or the extensions 24.1, 24.2.

It is noted that the tangs 46 could extend alternatively from the sleeve 24 and/or the extensions 24.1, 24.2, with the windows 48 formed in the sleeves 50 or some other component of the control systems 44, with the resulting system operating in substantially the same way as described herein. Further, while the term "window" is used, it is to be appreciated that it does not need to extend entirely through the structure in which it is formed and could be represented as a pocket, recess, groove, etc. that is nevertheless suitable for selectively enabling the transfer of forces between the control systems 44 and the sleeve 24. It is to be appreciated that the direction in which the windows 48 extend generally corresponds to the direction of actuation of the sleeve 24, and correspondingly that the windows 48 could be arranged to extend circumferentially, radially, etc., if the sleeve 24 is replaced with a member that actuates in some direction other than axially.

Due to the above-described arrangement, any one or more of the control systems 44 can be selected and actuated to shift the corresponding tangs 46 and sleeves 50 in the direction of actuation. Specifically, actuation of ones of the control systems 44 results in the tangs 46 of the actuated control systems 44 to bottom-out in their corresponding windows 48, thereby engaging the sleeve 24 (and/or the extensions 24.1 or 24.2) and enabling a transfer of forces from the actuated control systems 44 to the sleeve 24. The tangs 46 of non-actuated ones of the control systems 44 will stay in their initial, neutral, center, run-in, or rest positions (e.g., as illustrated in FIG. 2), and "travel" (the non-actuated ones of the tangs 46 are actually stationary and only move relative to the sleeve 24, which is being shifted) along the length of their corresponding windows 48, thereby not influencing the shifting of the sleeve 24. In this way, even if certain ones of the control systems 44 break, fail to actuate, are not triggered, etc., the tangs 46 of these non-responsive control systems 44 will not interfere with operation of the valve assembly 12, but will instead simply travel between opposite sides their corresponding windows 48 as the sleeve 24 (and/or the extensions 24.1, 24.2) moves relative thereto.

As noted above, any of the control systems 44 can be actuated to control the operation of the sleeve 24, while the non-actuated control systems remain in their initial positions and do not interfere with the operation of the assembly 12. For example, the following description outlines a scenario in which only the control system 44a is utilized to open the sleeve 24 (shown in FIG. 3) from the initially closed position (shown in FIG. 2). The control system 44a, being selected to open the valve assembly 12, is actuated (via a process described in more detail in the following paragraphs), which drives the sleeve 50a and/or tangs 46a in the downhole direction and engages the tangs 46a against a set of corresponding shoulders 52 of the windows 48a (with the tangs 46a engaging an opposite set of shoulders 54 of the windows 48a for shifting the sleeve 24 back up-hole in order to re-close the valve assembly 12). Of course, the other windows 48 have similar shoulders (unlabeled) for enabling engagement between the other control systems 44 and the sleeve 24 via their corresponding tangs 46. Once so engaged, the control system 44a can transfer an actuation force via the tangs 46a to the sleeve 24 (e.g., via the extension 24.1) until the force exceeds some pre-determined minimum (e.g., required to release the collet 40 or some other release mechanism, if included, overcome friction, etc.), at which point the sleeve 24 shifts in the opening direction to the open position shown in FIG. 3. The sleeve 24 is shifted open in the downhole direction in the illustrated embodiment, although it will be readily appreciated by one of ordinary skill in the art that the location of the ports 28 can altered to instead make the valve close when the sleeve 24 is shifted downhole. As noted above, when in the open position, the ports 26 and 28 are aligned to enable fluid communication through the valve assembly 12. Since none of the other control systems (44b, 44c, 44d) are actuated in the example scenario depicted in FIG. 3, their corresponding tangs (46b, 46c, 46d) remain stationary in their initial positions (i.e., they are unmoved from FIG. 2 to FIG. 3, unlike the tangs 46a). As noted above, despite the lack of movement of some of the tangs (e.g., 46b, 46c, 46d in the illustrated example), the corresponding windows (48b, 48c, 48d) permit the sleeve 24 to move relative to the tangs. As a result, the unmoved tangs (e.g., 46b, 46c, 46d) are located proximate the opposite shoulder of their corresponding windows 48 after the sleeve 24 is shifted, as shown in FIG. 3, but do not interfere with operation of the sleeve 24.

Figure 3:
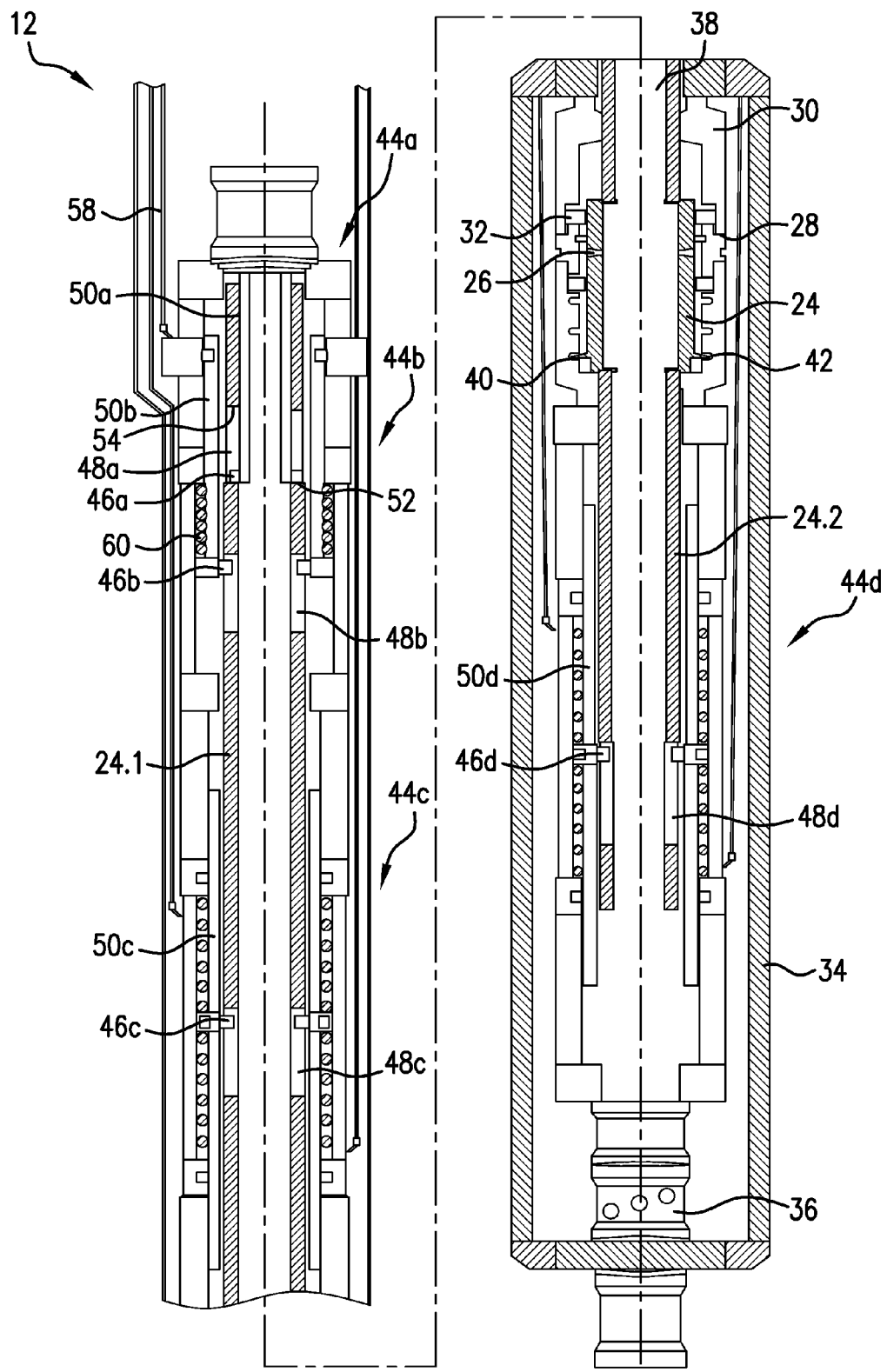
FIG. 3 is a cross-sectional view of the barrier valve assembly of FIG. 2 in an open configuration.

In the embodiment of FIGS. 2 and 3, the control system 44a is a mechanically activated system, while the control systems 44b, 44c, and 44d are hydraulically activated. One of ordinary skill in the art will of course readily appreciate that the control systems 44 may derive actuation force from any combination of sources, e.g., mechanical, hydraulic, magnetic, electrical, etc. Generally, it is to be appreciated that the type of actuation used by the control systems 44 is not particularly germane to the current invention and that portions of the control systems 44 may resemble various control or actuation systems known in the art. However, it is noted that while any type or combination of actuators can be used with the current invention, further benefits may be provided if at least two different actuation types are selected (e.g., both hydraulic and mechanical), as this further enhances contingencies for actuating the valve 12. Regardless, a brief description of each control system 44 is given below for demonstrative purposes.

In the illustrated embodiment, the control system 44a takes the form essentially of just the sleeve 50a with the tangs 46a. The sleeve 50a is arranged to physically receive another tubular or member, e.g., the upper completion 14, the production string 15, a setting tool deployed therewith, etc., for mechanically shifting the sleeve 50a in the downhole direction. This can be arranged as a single-shot system that actuates in one direction only, e.g., arranged only to open the valve. Alternatively, the end of the sleeve 50a could include a collet 55 or other release member, for releasably securing the sleeve 50a to the upper completion 14, the production string 15, the aforementioned setting tool, etc., in order for the control system 44a to also pull the sleeve 24 back up-hole in order to re-close the assembly 12. In one embodiment, the sleeve 50a is physically prevented by a stop or shoulder from moving from the position illustrated in FIG. 2 to the position illustrated in FIG. 3 and only enables automatic closure of the valve assembly 12 when the upper completion 14 is pulled out of the borehole 22. In this way, the control system 44a can be arranged with the upper completion to automatically open and/or close the valve assembly 12 when the upper completion is respectively engaged with and disengaged from the valve assembly 12.

The control system 44b in the illustrated embodiment is a single-shot uni-directional control system for opening the valve assembly 12 that is actuated by cycling hydraulic pressure. That is, the sleeve 50b and/or the tangs 46b create an actuation surface 56 having a greater surface area than an opposite side of the sleeve 50b for creating a pressure differential across the sleeve 50b to shift the sleeve 50b in the up-hole direction when the passageway 38 is pressurized. When pressure is bled off, e.g., via a hydraulic line 58, a spring 60 returns the tangs 46b to their initial position. After a predetermined number of cycles, a counter or J-slot mechanism (not shown) coupled to the sleeve 50b, e.g., resembling that included in the tool marketed under the name Model RB™ isolation valve and made commercially available from Baker Hughes, Inc., permits the sleeve 50b to be shifted further downhole. Once this movement is permitted, the tangs 46b are bottomed-out against the windows 48b by the spring 60, which shifts the sleeve 24 to the open position.

The control systems 44c and 44d are arranged similarly and thus described together, with similar components assigned the same base reference numerals. For ease in identification and discussion, the 'c' and 'd' alphabetic identifiers are included in the Figures, although like-components in both control systems 44c and 44d are collectively described herein according to the base numerals only. In essence, the tangs 46c and 46d act as pistons arranged with oppositely disposed hydraulic chambers 62 and 64, which are supplyable with pressurized fluid via a pair of lines 66 and 68, respectively. By pressurizing one of the chambers 62 or 64 more than the other, the tangs 46c can be moved in either direction to engage the shoulders of their corresponding windows 48 for shifting the sleeve 24 and opening and/or closing the valve assembly 12. A pair of springs 70 and 72 disposed respectively in the chambers 62 and 64 enables the tangs 46c to automatically return to their initial positions once pressure is bled off from or equalized between the chambers 62 and 64.

In one embodiment, multiple copies of the barrier valve assembly 12 are stacked together in tandem. In such an embodiment, the "bottom" or downhole-most valve assembly can be run either without a control system actuated mechanically by an upper completion (e.g., without the control system 44a), as it would be the "top" or up-hole valve assembly that engages the upper completion. Alternatively, such a control system could be arranged to always be disengaged from and/or unactuatable by, the up-hole valve assembly, so as not to interfere with movement of the sleeves 24. In this way, further redundancy can be built into a system, i.e., including two valves through which fluid selectively passes. As another example, a non-functional valve (e.g., stuck in the open position) can be effectively replaced without having to retrieve the non-functional valve, i.e., the new "replacement" system simply stacking on top of the old system and operating as described above.

While the invention has been described with reference to an exemplary embodiment or embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the claims. Also, in the drawings and the description, there have been disclosed exemplary embodiments of the invention and, although specific terms may have been employed, they are unless otherwise stated used in a generic and descriptive sense only and not for purposes of limitation, the scope of the invention therefore not being so limited. Moreover, the use of the terms first, second, etc. do not denote any order or importance, but rather the terms first, second, etc. are used to distinguish one element from another. Furthermore, the use of the terms a, an, etc. do not denote a limitation of quantity, but rather denote the presence of at least one of the referenced item.

What is claimed is:

1. A valve assembly, comprising:
a plurality of control systems;
a member actuatable by each of the control systems for controlling operation of the valve assembly;
a plurality of tangs, at least one tang corresponding to each of the control systems; and
a plurality of windows each having at least one shoulder, each tang disposed in one of the windows and selectively engagable with the at least one shoulder of the one of the windows, the tangs and the windows operative together to enable actuation forces to be selectively transferred from any group of selected ones of the control systems to the member via the tangs and the shoulders of corresponding ones of the windows for actuating the member while simultaneously permitting relative movement between the windows and the tangs corresponding to unselected ones of the control systems.

2. The assembly of claim 1, wherein the windows are formed in the member and at least one of the tangs extends from an actuatable component of each of the control systems.

3. The assembly of claim 2, wherein the member includes at least one extension and the plurality of openings are formed in the at least one extension of the member.

4. The assembly of claim 1, wherein the member includes one or more first ports therein that are selectively alignable with one or more second ports in a housing for the valve assembly for selectively controlling the valve assembly.

5. The assembly of claim 1, wherein the member is actuated in an axial direction to control operation of the valve assembly.

6. The assembly of claim 1, wherein the member is actuatable between an open position and a closed position for the valve assembly.

7. The assembly of claim 1, wherein the member is a sleeve.

8. The assembly of claim 1, wherein the plurality of control systems comprises four control systems.

9. The assembly of claim 1, wherein at least one of the control systems is located with respect to the member for actuating the member in a first direction toward a first position and at least another of the control systems is located with respect to the member for actuating the member in a second direction, opposite to the first direction, toward the first position.

10. The assembly of claim 1, wherein actuation of the control systems is mechanical, hydraulic, magnetic, electric, or a combination including at least one of the foregoing.

11. The assembly of claim 10, wherein actuation of a first control system of the plurality of control systems is different than actuation of a second control system of the plurality of control systems.

12. The assembly of claim 11 including at least one control system that is mechanically actuated and at least another control system that is hydraulically actuated.

13. A system including a valve assembly according to claim 1 as a barrier valve installed between a lower completion and an upper completion in a borehole.

14. A method of operating a valve assembly comprising:
selecting a subset of control systems from a plurality of control systems for the valve assembly, each control system having at least one tang corresponding thereto, each tang being disposed in one of a plurality of windows;
actuating the subset of selected control systems;
engaging each tang corresponding to the subset of selected the control systems with a shoulder of the one of the windows associated therewith;
transferring actuation forces from the subset of selected control systems to a valve member of the valve assembly via each tang engaged with the shoulder of the one of the windows associated therewith;
actuating the valve member between at least a first position and a second position; and
permitting, simultaneously to actuation of the valve member, relative movement between tangs corresponding to unselected ones of the control system and the ones of the windows associated therewith.

15. The method of claim 14, wherein the first position is an open position for the valve assembly and the second position is a closed position for the valve assembly.

16. The method of claim 15, further comprising opening the valve assembly after engagement of the valve assembly between a lower completion and an upper completion.

17. The method of claim 15, further comprising closing the valve assembly then removing the upper completion.

18. The method of claim 14, wherein the windows are formed in the valve member and the tangs extend from a component of each of the control systems.

19. The method of claim 14, wherein at least one of the control systems is arranged to actuate the valve member in a first direction to the first position and at least another of the control systems is arranged to actuate the valve member in a second direction, opposite to the first direction, to the first position.

20. The method of claim 14, wherein actuation of the valve member is accomplished mechanically, hydraulically, electrically, magnetically, or via a combination of at least one of the foregoing.

* * * * *